(12) United States Patent
Chin et al.

(10) Patent No.: US 11,297,642 B2
(45) Date of Patent: Apr. 5, 2022

(54) METHOD AND APPARATUS FOR UPLINK TRANSMISSION

(71) Applicant: Hannibal IP LLC, Frisco, TX (US)

(72) Inventors: Heng-Li Chin, Taipei (TW);
Chia-Hung Wei, Hsinchu (TW);
Wan-Chen Lin, Hualien (TW);
Yu-Hsin Cheng, Hsinchu (TW);
Chie-Ming Chou, Hsinchu (TW)

(73) Assignee: Hannibal IP LLC, Frisco, TX (US)

( * ) Notice: Subject to any disclaimer, the term of this patent is extended or adjusted under 35 U.S.C. 154(b) by 114 days.

(21) Appl. No.: 16/678,766

(22) Filed: Nov. 8, 2019

(65) Prior Publication Data

US 2020/0154469 A1 May 14, 2020

Related U.S. Application Data

(60) Provisional application No. 62/758,038, filed on Nov. 9, 2018.

(51) Int. Cl.
*H04W 72/14* (2009.01)
*H04W 72/10* (2009.01)
(Continued)

(52) U.S. Cl.
CPC .......... *H04W 72/14* (2013.01); *H04L 1/0003* (2013.01); *H04L 1/1812* (2013.01); *H04W 72/0446* (2013.01); *H04W 72/10* (2013.01)

(58) Field of Classification Search
None
See application file for complete search history.

(56) References Cited

U.S. PATENT DOCUMENTS

2016/0270033 A1\* 9/2016 Yang .................... H04L 1/1861
2018/0103488 A1\* 4/2018 Marinier ............. H04W 74/006
2018/0124712 A1\* 5/2018 Lin ........................ H04L 5/001

FOREIGN PATENT DOCUMENTS

CN 102843771 A 12/2012
WO 2013109086 A1 7/2013

OTHER PUBLICATIONS

NTT Docomo, Inc., Maintenance for physical uplink control channel 3GPP TSG RAN WGl Meeting #94bis, R1-1811374, Sep. 29, 2018(Sep. 29, 2018), the whole document.

\* cited by examiner

*Primary Examiner* — Chi H Pham
*Assistant Examiner* — Raul Rivas
(74) *Attorney, Agent, or Firm* — Sul Lee Law Firm PLLC (57) ABSTRACT

A method for uplink transmission performed by a UE is provided. The method includes: receiving a first configured grant configuration that allocates a first PUSCH duration; receiving a second configured grant configuration that allocates a second PUSCH duration, wherein the second PUSCH duration overlaps with the first PUSCH duration; obtaining a first HARQ process ID for the first PUSCH duration, then determining whether a first configured grant timer associated with the first HARQ process ID is running; obtaining a second HARQ process ID for the second PUSCH duration, then determining whether a second configured grant timer associated with the second HARQ process ID is running; and selecting one of the first PUSCH duration and the second PUSCH duration for an uplink transmission based on whether the first configured grant timer is running and whether the second configured grant timer is running.

12 Claims, 8 Drawing Sheets

(51) Int. Cl.
*H04W 72/04* (2009.01)
*H04L 1/00* (2006.01)
*H04L 1/18* (2006.01)

METHOD AND APPARATUS FOR UPLINK TRANSMISSION

CROSS-REFERENCE TO RELATED APPLICATION(S)

The present application claims the benefit of and priority to a provisional U.S. Patent Application Ser. No. 62/758,038, filed on Nov. 9, 2018, entitled "Handling of Multiple Active Configured Grant Configurations," (hereinafter referred to as "US75448 application"). The disclosure of the US75448 application is hereby incorporated fully by reference into the present application.

FIELD

The present disclosure generally relates to wireless communication, and more particularly, to configured grant uplink transmission in the next generation wireless communication networks.

BACKGROUND

Various efforts have been made to improve different aspects of wireless communications, such as data rate, latency, reliability and mobility, for the next generation (e.g., fifth generation (5G) New Radio (NR)) wireless communication systems. In NR, uplink transmission for a user equipment (UE) may be based on a dynamic grant or a configured grant. There may be at least two different types of configured grant (also referred to as CG), including configured grant Type 1 (e.g., provided by Radio Resource Control (RRC) signaling) and configured grant Type 2 (e.g., provided by Physical Downlink Control Channel (PDCCH)). In one scenario, multiple CG configurations may be active simultaneously on different serving cells. For the same serving cell, a Medium Access Control (MAC) entity may be configured with either CG Type 1 or CG Type 2. In another scenario, multiple CG configurations may be active simultaneously for a bandwidth part (BWP) of a serving cell. There is a need in the industry for an improved and efficient mechanism for the UE to handle multiple active CG configurations, for example, for uplink transmission.

SUMMARY

The present disclosure is directed to a method for uplink transmission performed by a UE in the next generation wireless communication networks.

According to an aspect of the present disclosure, a UE is provided. The UE includes one or more non-transitory computer-readable media having computer-executable instructions embodied thereon and at least one processor coupled to the one or more non-transitory computer-readable media. The at least one processor is configured to execute the computer-executable instructions to: receive a first configured grant configuration, wherein the first configured grant configuration allocates a first Physical Uplink Shared Channel (PUSCH) duration; receive a second configured grant configuration, wherein the second configured grant configuration allocates a second PUSCH duration, wherein the second PUSCH duration overlaps with the first PUSCH duration in the time domain, and the first configured grant configuration and the second configured grant configuration are associated with a same serving cell; obtain a first Hybrid Automatic Repeat Request (HARQ) process ID for the first PUSCH duration; obtain a second HARQ process ID for the second PUSCH duration; determine whether a first configured grant timer associated with the first HARQ process ID is running after obtaining the first HARQ process ID; and select one of the first PUSCH duration and the second PUSCH duration for an uplink transmission based on whether the first configured grant timer is running and whether the second configured grant timer is running.

According to another aspect of the present disclosure, a method for uplink transmission performed by a UE is provided. The method includes: receiving a first configured grant configuration, wherein the first configured grant configuration allocates a first PUSCH duration; receiving a second configured grant configuration, wherein the second configured grant configuration allocates a second PUSCH duration, wherein the second PUSCH duration overlaps with the first PUSCH duration in the time domain, and the first configured grant configuration and the second configured grant configuration are associated with a same serving cell; obtaining a first HARQ process ID for the first PUSCH duration; obtaining a second HARQ process ID for the second PUSCH duration; determining whether a first configured grant timer associated with the first HARQ process ID is running after obtaining the first HARQ process ID; determining whether a second configured grant timer associated with the second HARQ process ID is running after obtaining the second HARQ process ID; and selecting one of the first PUSCH duration and the second PUSCH duration for an uplink transmission based on whether the first configured grant timer is running and whether the second configured grant timer is running.

BRIEF DESCRIPTION OF THE DRAWINGS

Aspects of the example disclosure are best understood from the following detailed description when read with the accompanying figures. Various features are not drawn to scale. Dimensions of various features may be arbitrarily increased or reduced for clarity of discussion.

DETAILED DESCRIPTION

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s).

The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more base stations.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present application should not be limited to the above-mentioned protocols.

A base station may include, but is not limited to, a node B (NB) as in the UMTS, an evolved node B (eNB) as in the LTE or LTE-A, a radio network controller (RNC) as in the UMTS, a base station controller (BSC) as in the GSM/GERAN, a ng-eNB as in an E-UTRA base station in connection with the 5GC, a next generation Node B (gNB) as in the 5G-RAN, and any other apparatus capable of controlling radio communication and managing radio resources within a cell. The base station may serve one or more UEs through a radio interface.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting Proximity Service (ProSe) or Vehicle to Everything (V2X) service. Each cell may have overlapped coverage areas with other cells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resources may also be provided in an NR frame to support ProSe services or V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

Figure 1:
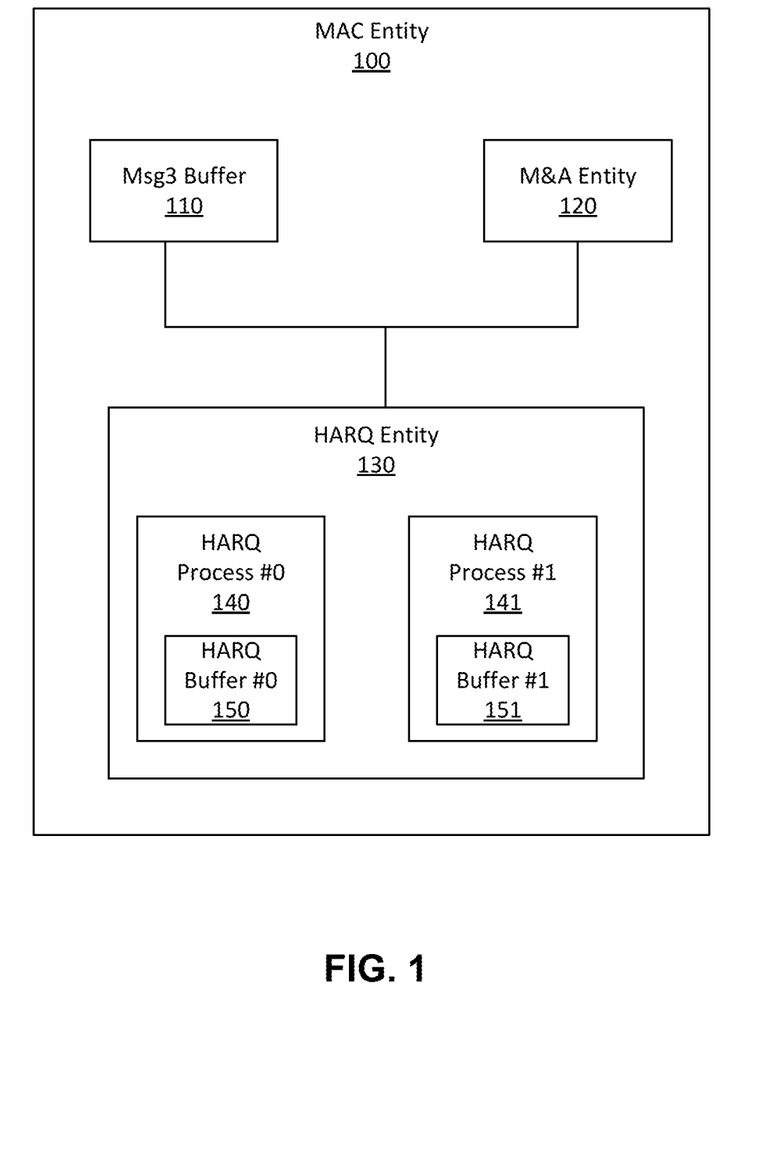
FIG. 1 is a block diagram illustrating an example MAC entity of a UE, according to an example implementation of the present application.

FIG. 1 is a block diagram illustrating an example MAC entity of a UE, according to an example implementation of the present application. MAC entity 100 may include Msg3 buffer 110, Multiplexing and Assembly (M&A) entity 120, and HARQ entity 130. In one implementation, when MAC entity 100 receives a UL grant, HARQ entity 130 may obtain a MAC Protocol Data Unit (PDU) from Msg3 buffer 110 or M&A entity 120. Afterwards, HARQ entity 130 may deliver the obtained MAC PDU to a HARQ process. In one implementation, there may be several HARQ processes performed by HARQ entity 130, with each HARQ process having a HARQ process ID (e.g., HARQ process #0, HARQ process #1, HARQ process #2, and so on). Each process ID may be associated with a HARQ buffer. By way of example, as shown in FIG. 1, HARQ process #0 140 is associated with HARQ buffer #0 150, and HARQ process #1 141 is associated with HARQ buffer #1 151.

In NR, multiple CG configurations may be active simultaneously for a BWP of a serving cell. A HARQ process ID (also referred to as "a HARQ ID") of each CG configuration may be handled by a MAC entity of the UE. For example, a HARQ ID may be derived by the UE based on a predefined equation, along with one or more parameters provided by a base station (e.g., a gNB). In one implementation, HARQ IDs between multiple active CG configurations may be distinct, such that a HARQ ID collision problem may be eliminated. In another implementation, HARQ IDs between multiple active CG configurations may be the same, and subsequent actions may be needed for resolving HARQ ID collision between active configured grants.

A base station may configure a CG timer via a configuredGrantTimer information element (IE) within a CG configuration (e.g., ConfiguredGrantConfig IE) through RRC signaling. The configuredGrantTimer IE may indicate an initial value of the CG timer as a multiple of a UL transmission periodicity. The UL transmission periodicity may be configured via a periodicity IE within the CG configuration. In one implementation where multiple CG configurations may be active in the same UL BWP simultaneously, the base station may optionally configure a configuredGrantTimer per BWP (e.g., the same CG timer value may be shared for all CG configurations in the same UL BWP). In one implementation, the base station may configure a configuredGrantTimer per CG configuration (e.g., the CG timer value may be configured per CG configuration).

In one implementation, for each serving cell and configured UL grant(s), if configured and activated, a MAC entity of a UE may check whether or not a PUSCH duration of a configured uplink grant overlaps in the time domain with a PUSCH duration of a UL grant received on the PDCCH for the serving cell, before determining a HARQ process ID associated with the PUSCH duration. Here, the PUSCH duration may refer to the duration that may be used by the UE for an initial transmission (e.g., this PUSCH duration may belong to part of a bundle of configured uplink grants that may be used for initial transmission according to Technical Standard (TS) 38.214. In one implementation, redundancy version (RV) of this PUSCH duration is zero). Moreover, the MAC entity may further determine whether the configuredGrantTimer for the corresponding HARQ process is running or not. If the configuredGrantTimer for the corresponding HARQ process is not running, the PUSCH duration may be considered available for transmitting a new MAC PDU. If a PUSCH duration is considered available for transmitting a new MAC PDU, the MAC entity may consider New Data Indicator (NDI) bits to have been toggled and deliver the configured uplink grant and the associated HARQ information to a HARQ entity, and the HARQ entity (e.g., HARQ entity 130 in FIG. 1) may obtain a MAC PDU to transmit on this PUSCH duration from a Multiplexing and Assembly entity (e.g., M&A entity 120 in FIG. 1).

Figure 2:
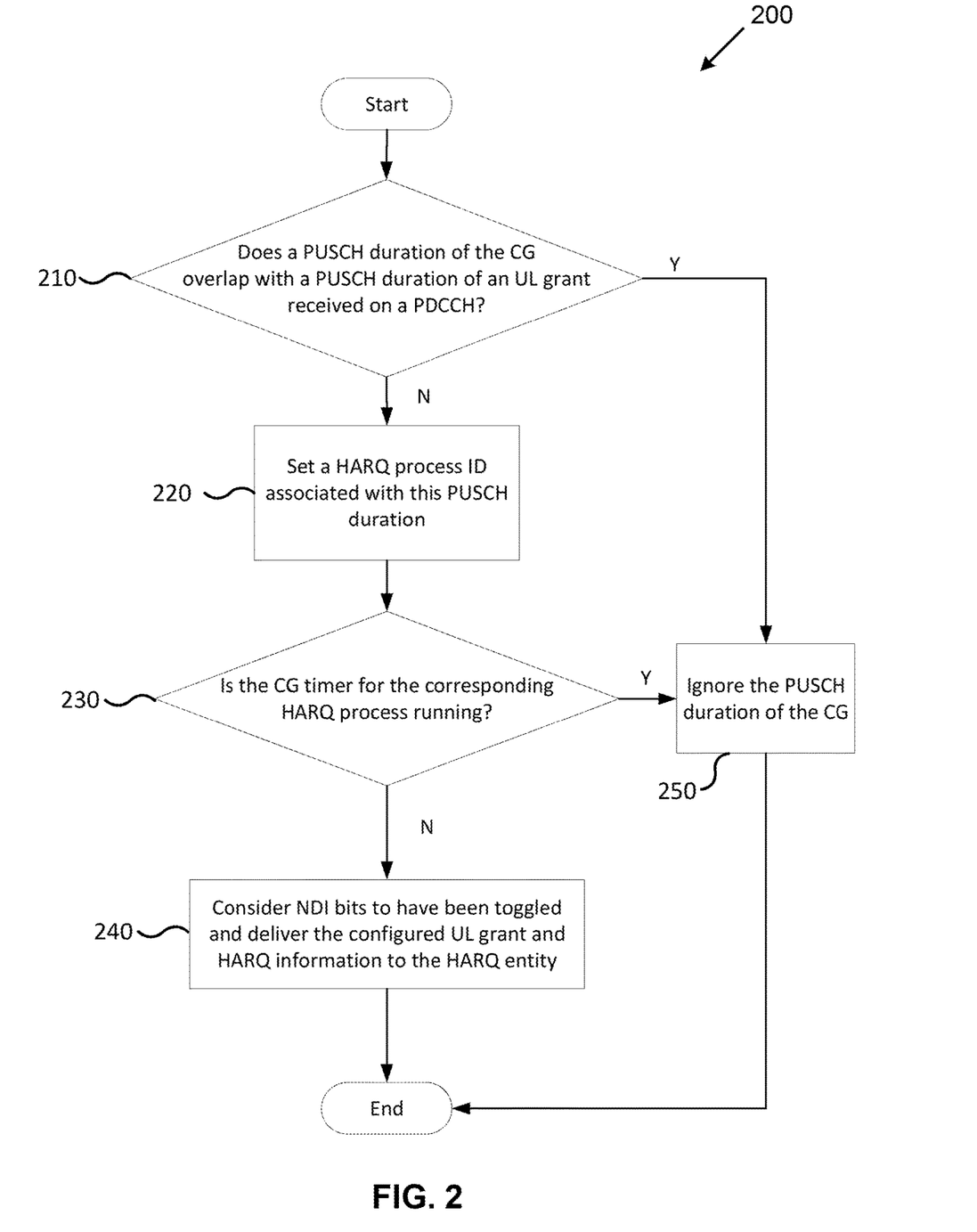
FIG. 2 is a flowchart of an example method for determining an availability of a CG PUSCH duration performed by a MAC entity of a UE, according to an example implementation of the present application.

FIG. 2 is a flowchart of an example method 200 for determining an availability of a CG PUSCH duration performed by a MAC entity of a UE, according to an example implementation of the present application. In one implementation, method 200 may be performed each time when the UE receives a PUSCH duration of a CG (also referred to as "a CG PUSCH duration"). The CG PUSCH duration may be used for an initial transmission. In action 210, the MAC entity may determine whether a PUSCH duration of a configured grant overlaps with a PUSCH received on a PDCCH (e.g., a dynamic grant). If there is no overlapping, in action 220, the MAC entity may set a HARQ process ID (e.g., based on a predefined equation) associated with the PUSCH duration of the configured grant. If there is overlapping, in action 250, the MAC entity may ignore the PUSCH duration of the CG. In action 230, the MAC entity may determine whether the CG timer for the HARQ process (which is associated with the HARQ process ID derived in action 220) is running. If the CG timer is running, the PUSCH duration may not be available for transmitting a new MAC PDU. In action 250, the MAC entity may ignore the PUSCH duration of the CG. On the other hand, if the CG timer is not running, in action 240, the PUSCH duration may be considered available for transmitting a new MAC PDU. In this case, the MAC entity may consider NDI bits to have been toggled and deliver the configured UL grant and HARQ information to the HARQ entity.

If multiple CG configurations may be configured and activated in the same serving cell simultaneously, there may be more overlapping cases. For instance, a PUSCH duration (also referred to as "a PUSCH resource") from one CG configuration may overlap with one or more PUSCH durations of other CG configurations. Here, the term "PUSCH duration" may refer to either a PUSCH duration that may be used for an initial transmission (e.g., this PUSCH duration belongs to part of a bundle of configured uplink grants that may be used for initial transmission according to TS 38.214. In one implementation, RV of this PUSCH duration is zero) or a PUSCH duration that may be used for a repetition transmission (e.g., this PUSCH duration belongs to part of a bundle of configured uplink grants that may not be used for initial transmission according to TS 38.214. In one implementation, RV of this PUSCH duration is not zero). Moreover, the term "overlapping" may refer to overlapping between PUSCH durations in the time domain. In one implementation, the MAC entity may, for each CG PUSCH duration, check whether it overlaps with one or more PUSCH durations from other CG configurations.

There may be several PUSCH duration overlapping cases, including Case 1: overlapping between PUSCH durations that may be used for initial transmissions from more than one CG configurations; Case 2: overlapping between PUSCH durations that may be used for repetition transmissions from multiple CG configurations; and Case 3: overlapping between PUSCH durations from multiple CG configurations, wherein at least one PUSCH duration may be used for an initial transmission and at least one PUSCH duration may be used for a repetition transmission.

Figure 3:
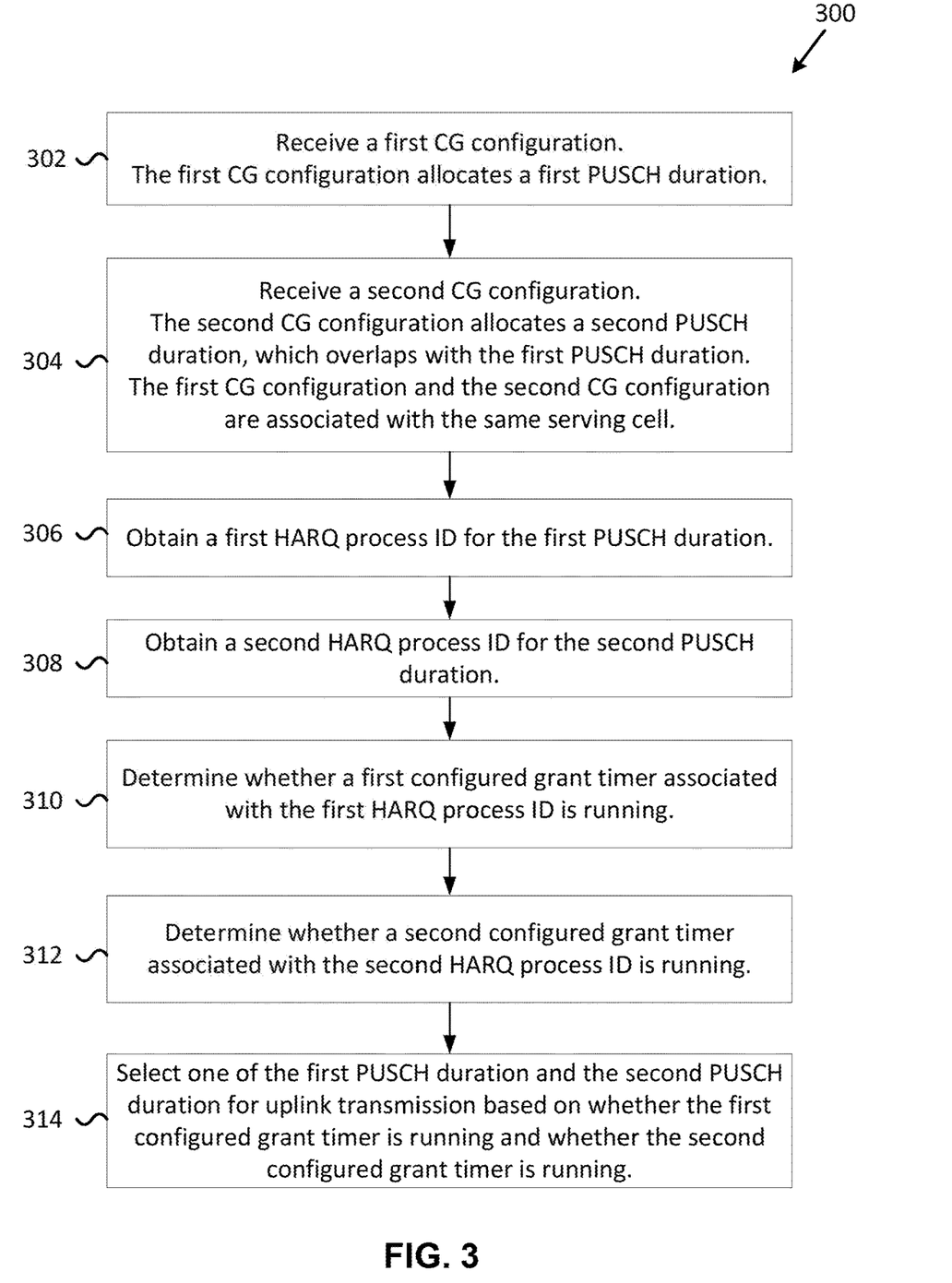
FIG. 3 is a flowchart of an example method for an uplink transmission performed by a UE, according to an example implementation of the present application.

FIG. 3 is a flowchart of an example method 300 for uplink transmission performed by a UE (e.g., a MAC entity of the UE), according to an example implementation of the present application. In action 302, the UE may receive a first CG configuration, wherein the first CG configuration allocates a first PUSCH duration. In action 304, the UE may receive a second CG configuration, wherein the second CG configuration allocates a second PUSCH duration. The second PUSCH duration overlaps with the first PUSCH duration in the time domain. In one implementation, the first CG configuration and the second CG configuration may be associated with the same serving cell.

In action 306, the UE may obtain a first HARQ process ID for the first PUSCH duration. In action 308, the UE may obtain a second HARQ process ID for the second PUSCH duration. In one implementation, the UE may derive the corresponding HARQ process ID based on a predefined equation along with one or more parameters provided by a base station. In action 310, the UE may determine whether a first configured grant timer associated with the first HARQ process ID is running after obtaining the first HARQ process ID. In action 312, the UE may determine whether a second configured grant timer associated with the second HARQ process ID is running after obtaining the second HARQ process ID. In action 314, the UE may select one of the first PUSCH duration and the second PUSCH duration for uplink transmission based on whether the first configured grant timer is running and whether the second configured grant timer is running. An expiry time of the first CG timer may be configured in the first CG configuration, and an expiry time of the second CG timer may be configured in the second CG configuration. Several implementations of method 300 are provided below.

Case 1: Overlapping Between PUSCH Durations that May be Used for an Initial Transmission.

After confirming a PUSCH duration of a configured uplink grant does not overlap with a PUSCH duration of an uplink grant received on the PDCCH for the serving cell, a MAC entity may additionally check whether the PUSCH duration that may be used for an initial transmission (e.g., RV of this PUSCH duration is zero) of an active CG configuration overlaps with one or more PUSCH durations that may be used for initial transmissions (e.g., RV of this PUSCH duration is also zero) from another active CG configuration for the UL BWP. If there is overlapping, the MAC entity may derive HARQ process IDs of all the CG PUSCH durations that are overlapping.

In one implementation, separate HARQ ID pools may be used for different CG configurations (e.g., same HARQ ID may not be obtained from more than one CG configurations that are active in the same UL BWP). A MAC entity may, for each overlapping PUSCH duration that may be used for an initial transmission (e.g., RV of these PUSCH durations are zero), check if the CG timer corresponding to the derived HARQ process ID of the PUSCH duration is not running. If the CG timers that is associated with the derived HARQ IDs from all the overlapping CG PUSCH durations are running, none of the PUSCH durations may be considered available for transmitting a new MAC PDU. If only one of the CG timers that is associated with the derived HARQ ID is not running, the MAC entity may consider the corresponding PUSCH duration available for transmitting a new MAC PDU. In this case, the MAC entity may consider NDI bits to have been toggled and deliver the configured uplink grant and the associated HARQ information of this PUSCH duration to a HARQ entity, and the HARQ entity may obtain a MAC PDU to transmit on this PUSCH duration from a Multiplexing and Assembly entity.

Figure 4:
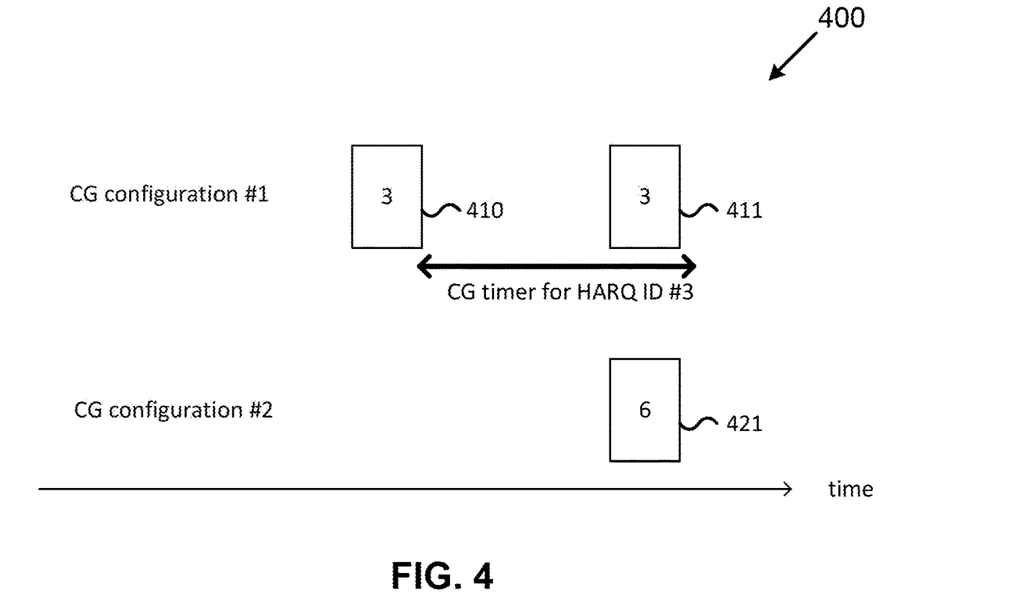
FIG. 4 shows a diagram illustrating an example resource selection performed by a MAC entity of a UE, according to an example implementation of the present application.

FIG. 4 shows a diagram 400 illustrating an example of resource selection performed by a MAC entity of a UE, according to an example implementation of the present application. CG configuration #1 allocates PUSCH duration 410 and PUSCH duration 411, each having a HARQ ID #3. CG configuration #2 allocates PUSCH duration 421, which has a HARQ ID #6. CG configuration #1 and CG configuration #2 may be associated with the same serving cell. PUSCH duration 410, PUSCH duration 411, and PUSCH duration 421 may be all for initial transmission (e.g., RVs of these PUSCH durations are zero). PUSCH duration 421 overlaps with PUSCH duration 411 in the time domain. After determining that the CG timer associated with HARQ ID #3 is running (e.g., at the moment PUSCH duration 411 overlaps with PUSCH duration 421) and the CG timer associated with HARQ ID #6 is not running, the MAC entity may select PUSCH duration 421 for an uplink transmission. PUSCH duration 421 may be considered available for transmitting a new MAC PDU. In this case, the MAC entity may consider NDI bits to have been toggled and deliver the configured uplink grant and the associated HARQ information of PUSCH duration 421 to a HARQ entity, and the HARQ entity may obtain a MAC PDU to transmit on PUSCH duration 421 from a Multiplexing and Assembly entity.

If multiple CG timers that that are associated with the derived HARQ IDs are not running, the MAC entity may select a PUSCH duration of those overlapping CG PUSCH durations whose corresponding CG timers are not running. In one implementation, the MAC entity may select one of these overlapping PUSCH durations that corresponds to the CG configuration having the highest priority. The selected PUSCH duration is considered available for transmitting a new MAC PDU. The MAC entity may consider NDI bits to have been toggled and deliver the configured uplink grant and the associated HARQ information of the selected PUSCH duration to a HARQ entity, and the HARQ entity may obtain a MAC PDU to transmit on this PUSCH duration from the Multiplexing and Assembly entity. In one implementation, when the overlapping CG configurations have the same or equal priority, it may depend on the UE's implementation to determine which PUSCH duration is to be selected. Several implementations of the priority of the CG configuration are provided in Case 4.

Figure 5:
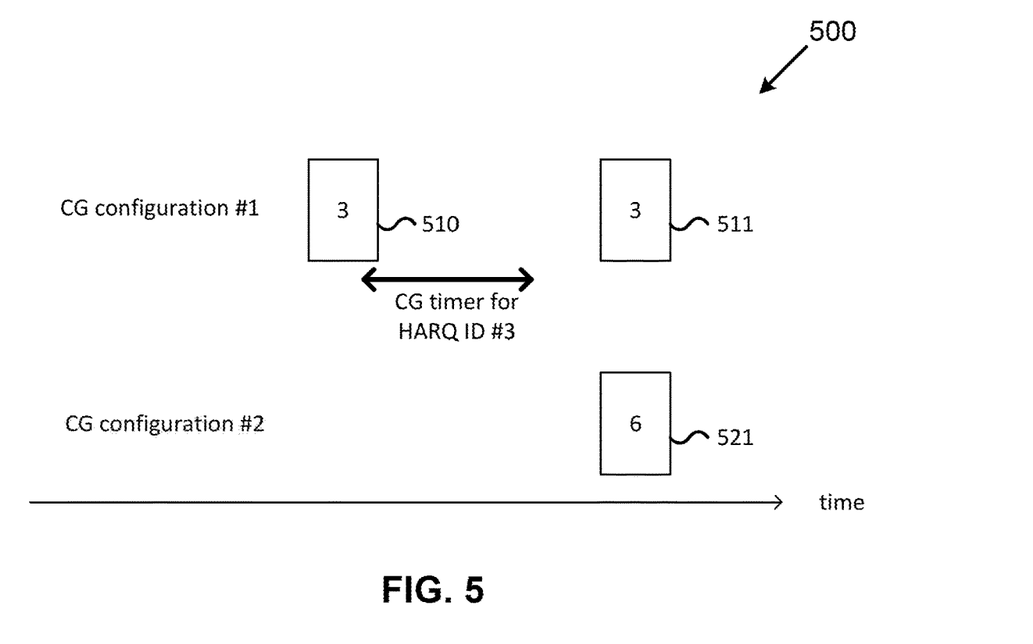
FIG. 5 shows a diagram illustrating another example resource selection performed by a MAC entity of a UE, according to an example implementation of the present application.

FIG. 5 shows a diagram 500 illustrating another example resource selection performed by a MAC entity of a UE, according to an example implementation of the present application. CG configuration #1 allocates PUSCH duration 510 and PUSCH duration 511, each having a HARQ ID #3. CG configuration #2 allocates PUSCH duration 521, which has a HARQ ID #6. CG configuration #1 and CG configuration #2 may be associated with the same serving cell. PUSCH duration 510, PUSCH duration 511, and PUSCH duration 521 may be all for initial transmissions (e.g., RVs of these PUSCH durations are zero). PUSCH duration 521 overlaps with PUSCH duration 511 in the time domain. After determining that the CG timer associated with HARQ ID #3 is not running (e.g., at the moment PUSCH duration 511 overlaps with PUSCH duration 521) and the CG timer associated with HARQ ID #6 is not running, the MAC entity may select either PUSCH duration 511 or PUSCH duration 521 for an uplink transmission. In one implementation, the MAC entity may consider which one of CG configuration #1 or CG configuration #2 has a higher priority, and then select the corresponding PUSCH duration accordingly.

After prioritization, the selected PUSCH duration may be considered available for transmitting a new MAC PDU. The MAC entity may consider NDI bits to have been toggled and deliver the corresponding HARQ information of the selected PUSCH duration to the HARQ entity, and the HARQ entity may obtain the MAC PDU to transmit from a Multiplexing and Assembly entity, if any.

In one implementation, a HARQ ID pool may be used for different CG configurations (e.g., same HARQ ID may be derived from multiple CG configurations that are active in the same UL BWP), and a CG timer may be optionally configured per UL BWP (e.g., the CG timer value may be the same among all of the CG configurations in the same UL BWP) or per CG configuration (e.g., the CG timer value may be configured per CG configuration). A MAC entity may, for each overlapping PUSCH duration that may be used for an initial transmission, check (a) whether the CG timer corresponding to derived HARQ process ID of this PUSCH duration is not running or (b) whether the CG timer is currently running but was started by a CG configuration having a lower priority than the CG configuration of this PUSCH duration. If none of the overlapping PUSCH durations satisfies the above-mentioned condition (i.e., condition (a) or condition (b)), none of the PUSCH durations may be considered available for transmitting a new MAC PDU. If only one of the overlapping PUSCH durations satisfies this condition, the MAC entity may consider this PUSCH duration as available for transmitting a new MAC PDU. If more than one overlapping PUSCH durations satisfy the above-mentioned condition (a) or condition (b), the MAC entity may select one of these PUSCH durations that corresponds to the CG configuration having the highest priority. When the CG configurations have the same or equal priority, it may be up to the UE's implementation to determine which PUSCH duration is to be selected. Several implementations of the priority of the CG configuration are provided in Case 4.

Figure 6:
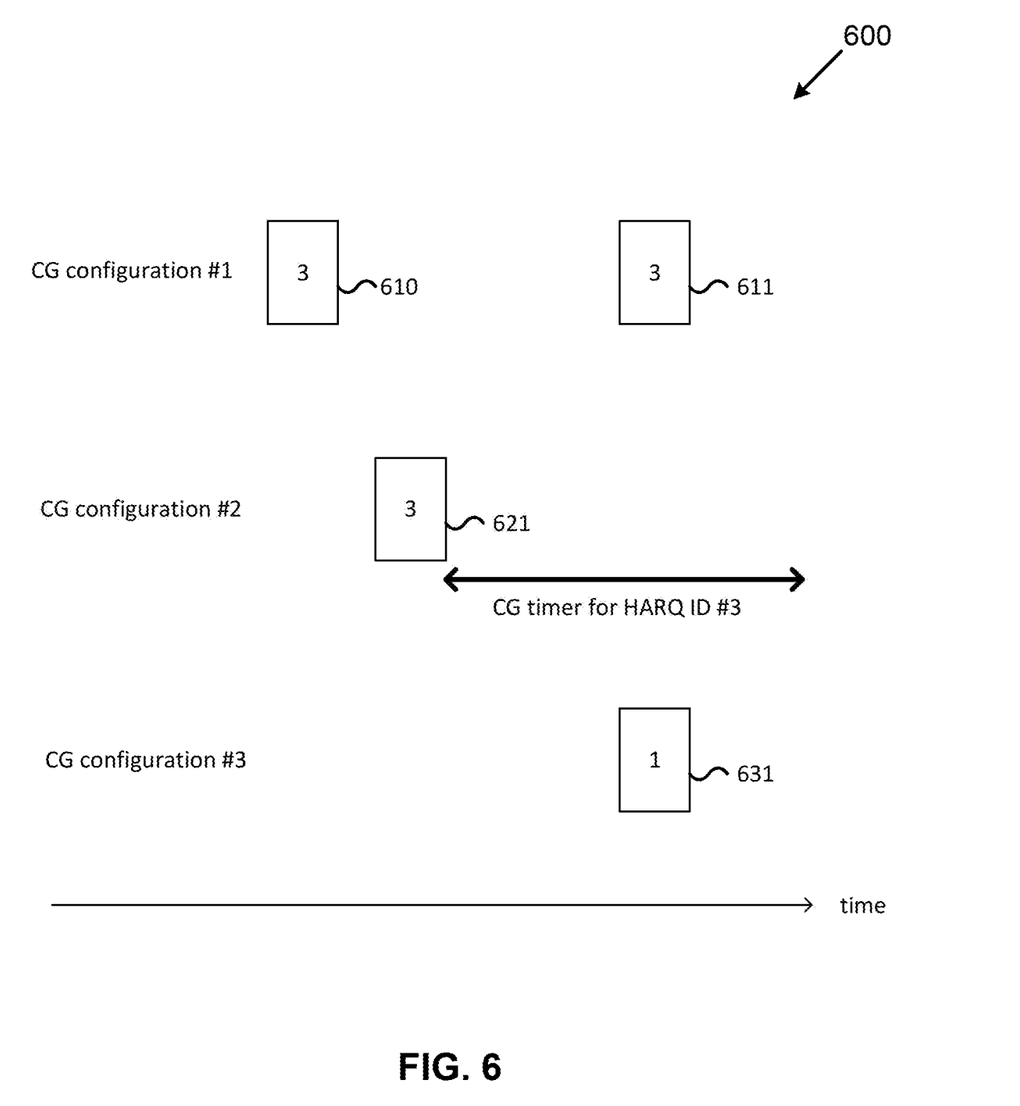
FIG. 6 shows a diagram illustrating an example method for handling resource overlapping and HARQ ID collision performed by a MAC entity of a UE, according to an example implementation of the present application.

FIG. 6 shows a diagram 600 illustrating an example method for handling resource overlapping and HARQ ID collision performed by a MAC entity, according to an example implementation of the present application. CG configuration #1 allocates PUSCH duration 610 and PUSCH duration 611, each having a HARQ ID #3. CG configuration #2 allocates PUSCH duration 621, which has a HARQ ID #3 (e.g., because of a shared HARQ ID pool). CG configuration #3 allocates PUSCH duration 631, which has a HARQ ID #1. PUSCH duration 610, PUSCH duration 611, PUSCH duration 621, and PUSCH duration 631 may be all for initial transmission. PUSCH duration 611 overlaps with PUSCH duration 631 in the time domain. The CG timer associated with HARQ ID #3 is running when resource overlapping occurs (e.g., at the moment PUSCH duration 611 overlaps with PUSCH duration 631). The CG timer associated with HARQ ID #3 is started by CG configuration #2.

When CG configuration #2 has a higher priority than that of CG configuration #1, PUSCH duration 611 of CG configuration #1 may be prohibited by CG configuration #2 because CG configuration #2 having the higher priority is still occupying HARQ ID #3. In this case, the above-mentioned condition "(a) the CG timer corresponding to the HARQ process ID of this PUSCH duration is not running or (b) the CG timer is currently running but was started by a CG configuration having a lower priority" is satisfied by PUSCH duration 631 from CG configuration #3 only. Therefore, PUSCH duration 631 may be the only duration that is considered available for an initial transmission (e.g., for transmitting a new MAC PDU).

When CG configuration #2 has a lower priority than that of CG configuration #1, PUSCH duration 611 of CG configuration #1 may be prioritized over CG configuration #2 even though HARQ ID #3 is still occupied by CG configuration #2. In this case, the above-mentioned condition "(a) the CG timer corresponding to a HARQ process ID of this PUSCH duration is not running or (b) the CG timer is currently running but was started by a CG configuration having a lower priority" is satisfied by PUSCH duration 631 from CG configuration #3 and PUSCH duration 611 from CG configuration #1. In one implementation, when multiple overlapping PUSCH durations satisfy this condition, the MAC entity may select one PUSCH duration that corresponds to the CG configuration having the highest priority. That is, the MAC entity may select either PUSCH duration 611 or PUSCH duration 631 based on the priority levels of CG configuration #1 and CG configuration #3.

In one implementation, if a PUSCH duration (e.g., PUSCH duration 611) is selected for an initial transmission as a result of configured grant prioritization (e.g., a PUSCH duration is selected because its associated CG configuration has a higher priority), and its HARQ process overwrites another ongoing HARQ process with the same HARQ ID (e.g., HARQ ID #3) from another CG configuration with a lower priority level (e.g. CG configuration #2), the MAC entity may flush the HARQ buffer (which is associated with HARQ ID #3) before generating a new MAC PDU to be transmitted on the CG configuration with a higher priority (e.g., CG configuration #1).

In one implementation, if a PUSCH duration is selected for an initial transmission as a result of configured grant prioritization, and its HARQ process overwrites another ongoing HARQ process with the same HARQ ID from another CG configuration with lower priority level, a MAC entity may stop the ongoing CG timer associated with the CG configuration and/or HARQ process that is prioritized over. In one implementation, the MAC entity may flush the HARQ buffer before generating a new MAC PDU to be transmitted on the CG configuration with higher priority. In one implementation, the MAC entity may flush the HARQ buffer associated with the HARQ process that is prioritized over.

Figure 7:
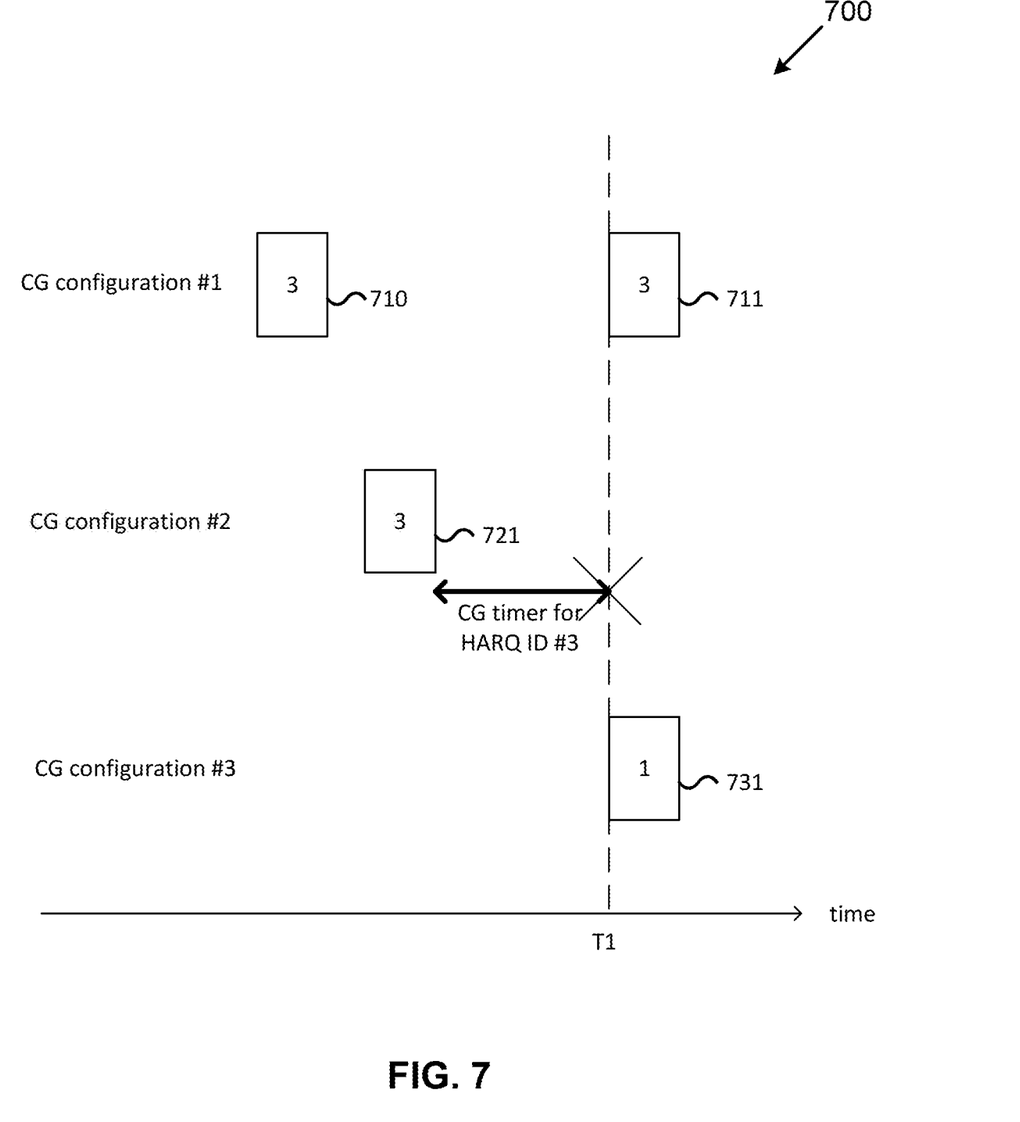
FIG. 7 shows a diagram illustrating another example method for handling resource overlapping and HARQ ID collision performed by a MAC entity of a UE, according to an example implementation of the present application.

FIG. 7 shows a diagram 700 illustrating another example method for handling resource overlapping and HARQ ID collision performed by a MAC entity, according to an example implementation of the present application. CG configuration #1 allocates PUSCH duration 710 and PUSCH duration 711, each having a HARQ ID #3. CG configuration #2 allocates PUSCH duration 721, which has a HARQ ID #3 (e.g., because of a shared HARQ ID pool). CG configuration #3 allocates PUSCH duration 731, which has a HARQ ID #1. PUSCH duration 710, PUSCH duration 711, PUSCH duration 721, and PUSCH duration 731 may be all for initial transmissions. PUSCH duration 711 overlaps with PUSCH duration 731 in the time domain. The CG timer associated with HARQ ID #3 is running when resource overlapping occurs (e.g., at the moment PUSCH duration 711 overlaps with PUSCH duration 731). This CG timer associated with HARQ ID #3 is started by CG configuration #2.

When CG configuration #1 has a higher priority than both CG configuration #2 and CG configuration #3, the MAC entity may select PUSCH duration 711 for an initial transmission. In addition, the MAC entity may also stop the ongoing CG timer associated with HARQ ID #3 of CG configuration #2 (e.g., at time T1) because it has been prioritized over by CG configuration #1. The MAC entity may also flush the HARQ buffer associated with HARQ ID #3 before generating a new MAC PDU to be transmitted on CG configuration #1.

Case 2: Overlapping Between PUSCH Durations that May be Used for Repetition Transmission.

After confirming a PUSCH duration of a configured uplink grant does not overlap with a PUSCH duration of an uplink grant received on the PDCCH for the serving cell, the MAC entity may additionally check whether a PUSCH duration that may be used for a repetition transmission (e.g., RV of this PUSCH duration is not zero) of an active CG configuration overlaps with another PUSCH duration that may be used for repetition transmission from another active CG configuration for this UL BWP (e.g., RV of this PUSCH duration is also not zero). In one implementation, if multiple PUSCH durations that may be used for repetition transmissions overlap, the MAC entity may select one of these overlapping PUSCH durations that corresponds to the CG configuration having the highest priority. In this case, a MAC PDU in a HARQ buffer associated to the HARQ process of the selected PUSCH duration may be transmitted. In one implementation, when the overlapping CG configurations have the same or equal priority, it may depend on the UE's implementation to determine which PUSCH duration is to be selected. Several implementations for the priority of the CG configuration are provided in Case 4.

Case 3: Overlapping Between PUSCH Duration(s) for Initial Transmission and PUSCH Duration(s) for Repetition Transmission(s).

After confirming a PUSCH duration of a configured uplink grant does not overlap with a PUSCH duration of an uplink grant received on the PDCCH for the serving cell, the MAC entity may additionally check whether the PUSCH duration that may be used for a repetition transmission (e.g., RV of this PUSCH duration is not zero) of an active CG configuration overlaps with another PUSCH duration that may be used for an initial transmission (e.g., RV of this PUSCH duration is zero) from another active CG configuration for the UL BWP. If there is overlapping, the MAC entity may derive HARQ process IDs of each overlapping PUSCH duration that may be used for initial transmissions.

In one implementation, separate HARQ ID pools may be used for different CG configurations (e.g., same HARQ ID may not be obtained from multiple CG configurations that are active in the same UL BWP). The MAC entity may, for each overlapping PUSCH duration that may be used for an initial transmission, check if the CG timer corresponding to derived HARQ process ID of the PUSCH duration is running. If the CG timers that correspond to the HARQ IDs of all the overlapping PUSCH durations that may be used for initial transmissions are running, none of these PUSCH durations may be considered available for transmitting a new MAC PDU. As a result, the MAC entity may only select the PUSCH durations for repetition transmissions. In this case, a MAC PDU in a HARQ buffer associated to the HARQ process of the selected PUSCH duration may be transmitted. In one implementation, selection of a PUSCH duration for repetition transmission may follow the rules covered in Case 2. If at least one CG timer that corresponds to the HARQ ID of the PUSCH duration that may be used for an initial transmission is not running, the MAC entity may select one out of these PUSCH durations that corresponds to the CG configuration having the highest priority. Several implementations for the priority of the CG configuration are provided in Case 4.

In one implementation, a HARQ ID pool may be used for different CG configurations (e.g., same HARQ ID may be obtained from multiple CG configurations that are active in the same UL BWP), and a CG timer may be optionally configured per UL BWP (e.g., same CG timer value may be used among different CG configurations in the same UL BWP) or per CG configuration (e.g., a CG timer value is configured per CG configuration). The MAC entity may, for each overlapping PUSCH duration that may be used for an initial transmission (e.g., RV of this PUSCH duration is zero), check (a) whether the CG timer corresponding to a derived HARQ process ID of this PUSCH duration is not running, or (b) whether the CG timer is currently running but was started by a CG configuration having a lower priority than the CG configuration of this PUSCH duration. If none of the overlapping PUSCH durations that may be used for an initial transmission satisfies this condition, the MAC entity may not select any of those PUSCH durations for initial transmissions (e.g., transmitting a new MAC PDU). As a result, the MAC entity may only select the PUSCH durations for repetition transmissions. In one implementation, the selection of a PUSCH duration for a repetition transmission may follow the rules covered in Case 2. If one or more overlapping PUSCH durations for initial transmissions satisfy this condition, the MAC entity may select one of these PUSCH durations that corresponds to the CG configuration having the highest priority. Several implementations for the priority of the CG configuration are provided in Case 4.

In one implementation, if a PUSCH duration is selected for an initial transmission as a result of configured grant prioritization, and its HARQ process overwrites another ongoing HARQ process with the same HARQ ID from another CG configuration with a lower priority level, the MAC entity may flush the HARQ buffer before generating a new MAC PDU to be transmitted on the CG configuration with a higher priority.

In one implementation, if a PUSCH duration is selected for an initial transmission as a result of configured grant prioritization, and its HARQ process overwrites another ongoing HARQ process with the same HARQ ID from another CG configuration with a lower priority level, the MAC entity may stop the CG timers associated with the CG configurations and/or HARQ process that are prioritized over. The MAC entity may flush the HARQ buffer before generating a new MAC PDU to be transmitted on the CG configuration with a higher priority.

Case 4: Priority of CG Configurations.

Case 4-1: In one implementation, the priority of a certain type of CG may be higher than another type. For example, CG Type 2 may have a higher priority than CG Type 1, or vice versa. On the other hand, two active CG configurations having the same type may have the same priority, and it may be up to the UE's implementation to determine which configuration to be selected.

Case 4-2: A priority level may be optionally configured by a base station (e.g., a gNB) per CG configuration (e.g., in configuredGrantConfig IE or in Downlink Control Information (DCI) that activates a CG Type 2 configuration). In one implementation, the priority level may include a "high priority level" and a "low priority level". For example, a UE may receive a first CG configuration and a second CG configuration. The first CG configuration may include a first priority level, and the second CG configuration may include a second priority level. The UE may determine the priority order of the first CG configuration and the second CG configuration according to the first priority level and the second priority level. In one implementation, if a priority level is not configured, the corresponding CG configuration may be considered as having either the lowest or the highest priority level than any other CG configuration that is configured with a priority level. Two CG configurations may be considered as having the same priority level if neither is configured with a priority level.

Case 4-3: A priority may be implicitly determined by a Modulation and Coding Scheme (MCS) value and/or MCS table associated with a CG configuration (e.g., the type of MCS table configured in configuredGrantConfig IE and/or the type of Radio Network Temporary Identifier (RNTI) associated with the DCI that activates a CG Type 2 configuration). In one example, a CG configuration associated with a high reliability MCS table (e.g., qam64LowSE) may be for a URLLC service, whereas a CG configuration associated with a low reliability MCS table (e.g., qam256) may be for an eMBB service. In one implementation, the MAC entity may prioritize a PUSCH duration that may be used for an initial transmission from a CG configuration with a high reliability MCS table. It may be up to the UE's implementation to determine which CG configuration is to be chosen for an initial transmission if multiple CG configurations are associated with the same reliability MCS table.

Case 4-4: A priority may be implicitly determined by a parameter periodicity, p, associated with a CG configuration (e.g., configuredGrantConfig IE). For instance, a CG configuration with a long periodicity may be for delay tolerant traffic. In one implementation, a MAC entity may prioritize an initial transmission on a PUSCH duration from a CG configuration with the shortest associated periodicity, p. It may be up to the UE's implementation to determine which CG configuration is to be chosen for an initial transmission if multiple CG configurations are associated with the same periodicity.

Case 4-5: A priority may be implicitly determined by the number of repetitions (e.g., parameter repK) associated with a CG configuration (e.g., configuredGrantConfig IE). For instance, a CG configuration with a larger repK may be for traffics that require a higher reliability. Therefore, the priority of the CG configuration associated with a larger repK may be higher.

Cases 4-6 through 4-9 may be used for scenarios where overlapping occurs between PUSCH duration(s) for initial transmission(s) and PUSCH duration(s) for repetition transmission(s).

Case 4-6: A MAC entity may prohibit the use of PUSCH duration for an initial transmission when PUSCH duration(s) for an initial transmission and PUSCH duration(s) for repetition transmission overlap. This may ensure that the repetition number is met by another CG configuration within the CG periodicity, p. Upon elimination of all the PUSCH duration(s) for an initial transmission, further prioritization may be made for the PUSCH duration(s) for repetition transmission based on implementations provided in Cases 4-1 through 4-5.

Case 4-7: A MAC entity may allow the use of a PUSCH duration for an initial transmission when PUSCH duration(s) for initial transmission(s) and PUSCH duration(s) for repetition transmission(s) overlap. This may ensure that arrived data is served by the earliest possible PUSCH duration if the corresponding CG timer is not running. Upon elimination of all the PUSCH duration(s) for repetition transmission(s), further prioritization may be made for the PUSCH duration (s) for initial transmission(s) based on implementations provided in Cases 4-1 through 4-5.

Case 4-8: A guaranteed number of repetitions (e.g., parameter GR) may be optionally configured by a base station per CG configuration (e.g., configuredGrantConfig IE). Among all overlapping PUSCH durations, if none of the PUSCH duration(s) for repetition transmission(s) is configured with this parameter, implementations provided in Cases 4-1 through 4-7 may be adopted. On the other hand, if at least one PUSCH duration for a repetition transmission is configured with this parameter, the MAC entity may allow the use of a PUSCH duration for a repetition transmission from a CG configuration whose number of repetition transmissions has not reached the parameter GR. After that, further prioritization may be made based on implementations provided in Cases 4-1 through 4-5.

Case 4-9: An allow-repetition timer may be optionally configured per CG configuration (e.g., configuredGrantConfig IE). If configured, the timer may start when the CG has been activated and an initial transmission is performed on a PUSCH duration for an initial transmission. Among all overlapping PUSCH durations, if none of the PUSCH duration(s) for repetition transmission(s) is configured with an allow-repetition timer, implementations provided in Cases 4-1 through 4-7 may be adopted. On the other hand, if at least one PUSCH duration for repetition transmission is configured with the allow-repetition timer, a MAC entity may allow the use of a PUSCH duration for repetition transmission from a CG configuration whose allow-repetition timer has not expired. After that, further prioritization may be made based on implementation provided in Cases 4-1 through 4-5.

Case 5: Handling the Transmission of a PUSCH Duration for an Initial Transmission when there is No PUSCH Overlapping.

When a PUSCH duration that may be used for an initiation transmission (e.g., the RV of this PUSCH duration is zero) from a CG configuration arrives, the MAC entity may check if this PUSCH duration overlaps with any other PUSCH durations. Moreover, in one implementation, the MAC entity may also check if this PUSCH duration overlaps with another PUSCH duration received on a PDCCH (e.g., a dynamic grant). If this PUSCH duration does not overlap with any other PUSCH durations, the MAC entity may determine the HARQ process ID associated with this PUSCH duration.

In one implementation, a common HARQ ID pool may be shared for every active CG configuration, and a CG timer may be configured per UL BWP or per CG configuration. The MAC entity may check (a) whether the CG timer that corresponds to the HARQ ID of this PUSCH duration is not running, or (b) whether the CG timer is currently running but was started by a CG configuration or a dynamic grant (DG) having a lower priority than the CG configuration of this PUSCH duration. If the above-mentioned condition (i.e., condition (a) or condition (b)) is not satisfied, the MAC entity may not consider this PUSCH duration available for initial transmissions (e.g., the MAC entity may not consider this PUSCH duration available for transmitting a new MAC PDU), and the MAC entity may neither deliver this grant to the HARQ entity nor obtain a new MAC PDU to transmit on this PUSCH duration. The reason is that the MAC entity knows the HARQ ID is currently occupied by a dynamic transmission/retransmission or a CG transmission/retransmission that has an equal or higher priority than the CG configuration of this PUSCH duration. On the contrary, if the above-mentioned condition is satisfied, the MAC entity may consider the PUSCH duration available for initial transmission (e.g., the MAC entity may consider this PUSCH duration available for transmitting a new MAC PDU). In this case, the MAC entity may consider the NDI bit for the corresponding HARQ process to have been toggled and deliver the configured UL grant and associated HARQ information to the HARQ entity. The reason is that the MAC entity knows the HARQ ID is either unoccupied or occupied by a CG configuration having a lower priority.

In one implementation, if a PUSCH duration is selected for an initial transmission (e.g., a PUSCH duration is selected for transmitting a new MAC PDU) as a result of configured grant prioritization, and its HARQ process overwrites another ongoing HARQ process with the same HARQ ID from another CG configuration with a lower priority level or another DG with lower priority level, the MAC entity may flush the HARQ buffer before generating a new MAC PDU to be transmitted on the CG configuration with a higher priority.

In one implementation, if a PUSCH duration is selected for an initial transmission (e.g., a PUSCH duration is selected for transmitting a new MAC PDU) as a result of configured grant prioritization, and its HARQ process overwrites another ongoing HARQ process with the same HARQ ID from another CG configuration or DG with a lower priority level, the MAC entity may stop a CG timer associated with a CG configuration and/or HARQ process that has been prioritized over. In one implementation, the MAC entity may flush the HARQ buffer before generating a new MAC PDU to be transmitted on the CG configuration with a higher priority. In one implementation, the MAC entity may flush the HARQ buffer associated with the HARQ process that has been prioritized over.

Figure 8:
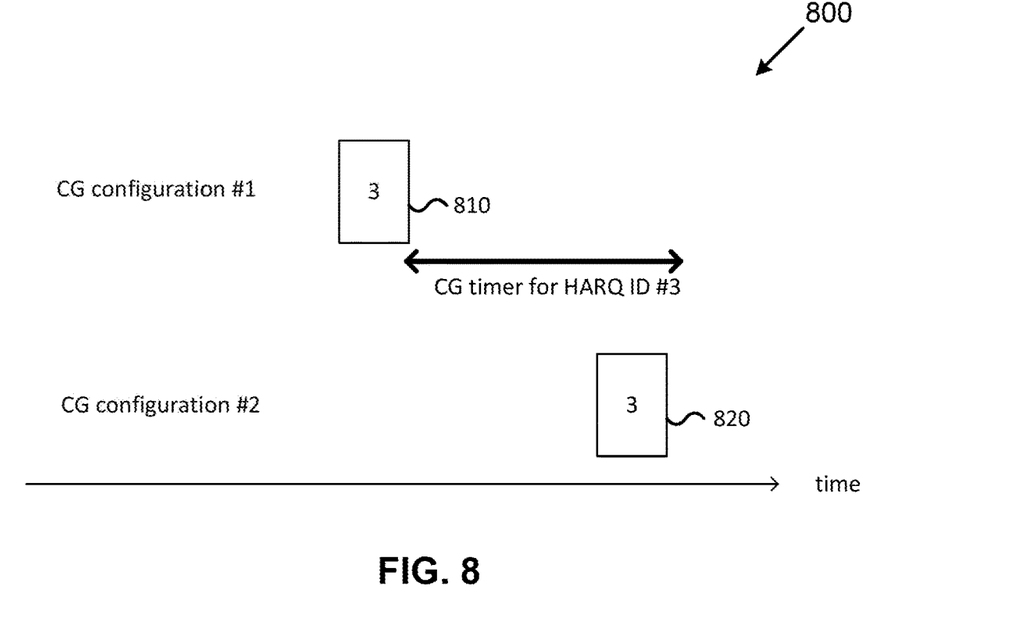
FIG. 8 shows a diagram illustrating an example method for handling HARQ ID collision performed by a MAC entity of a UE, according to an example implementation of the present application.

FIG. 8 shows a diagram 800 illustrating an example method for handling HARQ ID collision performed by a MAC entity of a UE, according to an example implementation of the present application. CG configuration #1 allocates PUSCH duration 810, which has a HARQ ID #3. CG configuration #2 allocates PUSCH duration 820, which has a HARQ ID #3 (e.g., because of a shared HARQ ID pool. The CG timer associated with HARQ ID #3 is running when a HARQ ID collision occurs (e.g., at the moment the HARQ ID of PUSCH duration 820 is derived). In this example, CG configuration #1 has a higher priority than that of CG configuration #2. Transmission on PUSCH duration 820 may be prohibited because the derived HARQ ID of PUSCH duration 820 is still occupied by CG configuration #1 having a higher priority.

Figure 9:
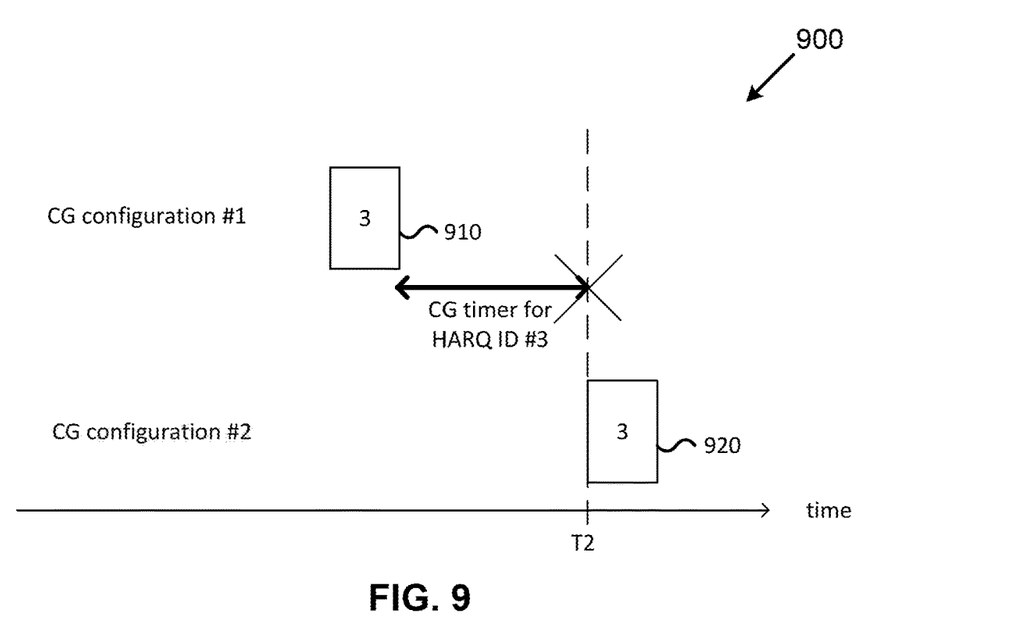
FIG. 9 shows a diagram illustrating another example method for handling HARQ ID collision performed by a MAC entity of a UE, according to an example implementation of the present application.

FIG. 9 shows a diagram 900 illustrating another example method for handling a HARQ ID collision performed by a MAC entity of a UE, according to an example implementation of the present application. CG configuration #1 allocates PUSCH duration 910, which has a HARQ ID #3. CG configuration #2 allocates PUSCH duration 920, which has a HARQ ID #3 (e.g., because of a shared HARQ ID pool). The CG timer associated with HARQ ID #3 is running when the HARQ ID collision occurs (e.g., at the moment the HARQ ID of PUSCH duration 920 is derived). In this example, CG configuration #2 has a higher priority than that of CG configuration #1. Transmission on PUSCH duration 920 may be allowed even though the derived HARQ ID of PUSCH duration 920 is still occupied by CG configuration #1. The MAC entity may stop the CG timer started by CG configuration #1 (e.g., before PUSCH duration 920 starts). Because CG configuration #1 is prioritized over, the MAC entity may also flush the HARQ buffer (which is associated with HARQ ID #3) before generating a new MAC PDU to be transmitted on CG configuration #2.

The examples shown in FIG. 8 and FIG. 9 illustrate HARQ ID collision between two CG configurations. It should be noted that a HARQ ID collision may also occur between a configured grant and a dynamic grant. The MAC entity may determine which one is allowed for transmission depending on the priority orders of the configured grant and the dynamic grant. For example, a HARQ ID of a configured grant PUSCH duration may override a HARQ ID of a dynamic grant PUSCH duration when the configured grant has a higher priority than the dynamic grant.

Figure 10:
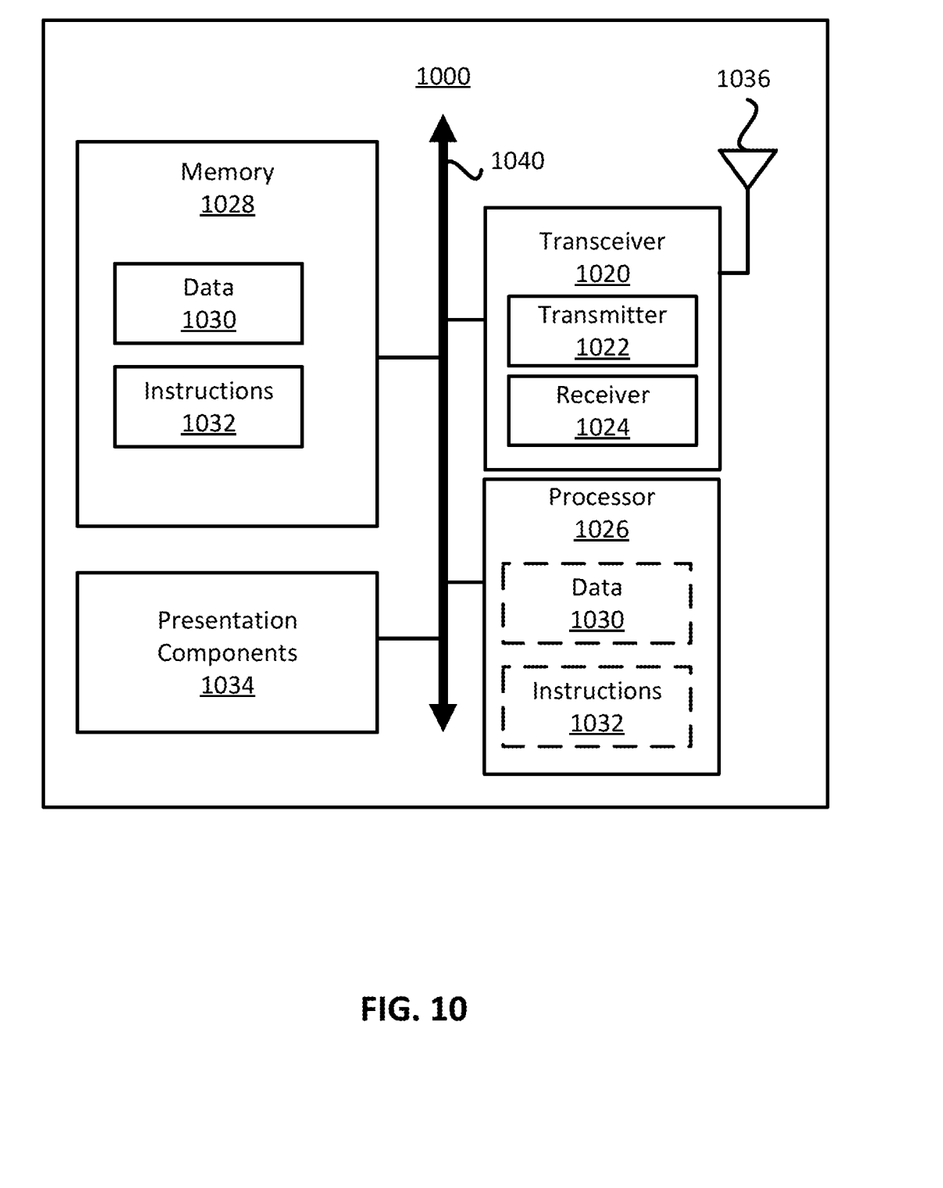
FIG. 10 is a block diagram illustrating a node for wireless communication according to various aspects of the present application.

FIG. 10 is a block diagram illustrating a node for wireless communication, in accordance with various aspects of the present application. As shown in FIG. 10, a node 1000 may include a transceiver 1020, a processor 1028, a memory 1034, one or more presentation components 1038, and at least one antenna 1036. The node 1000 may also include an RF spectrum band module, a base station (BS) communications module, a network communications module, and a system communications management module, Input/Output (I/O) ports, I/O components, and power supply (not explicitly shown in FIG. 10). Each of these components may be in communication with each other, directly or indirectly, over one or more buses 1040. In one implementation, the node 1000 may be a UE or a base station that performs various functions described herein, for example, with reference to FIGS. 1 through 9.

The transceiver 1020 having a transmitter 1022 (e.g., transmitting/transmission circuitry) and a receiver 1024

(e.g., receiving/reception circuitry) may be configured to transmit and/or receive time and/or frequency resource partitioning information. In some implementations, the transceiver 1020 may be configured to transmit in different types of subframes and slots including, but not limited to, usable, non-usable and flexibly usable subframes and slot formats. The transceiver 1020 may be configured to receive data and control channels.

The node 1000 may include a variety of computer-readable media. Computer-readable media may be any available media that may be accessed by the node 1000 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or data.

Computer storage media includes RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 1034 may include computer-storage media in the form of volatile and/or non-volatile memory. The memory 1034 may be removable, non-removable, or a combination thereof. Example memory includes solid-state memory, hard drives, optical-disc drives, and etc. As illustrated in FIG. 10, The memory 1034 may store computer-readable, computer-executable instructions 1032 (e.g., software codes) that are configured to, when executed, cause the processor 1028 to perform various functions described herein, for example, with reference to FIGS. 1 through 9. Alternatively, the instructions 1032 may not be directly executable by the processor 1028 but be configured to cause the node 1000 (e.g., when compiled and executed) to perform various functions described herein.

The processor 1028 (e.g., having processing circuitry) may include an intelligent hardware device, e.g., a Central Processing Unit (CPU), a microcontroller, an ASIC, and etc. The processor 1028 may include memory. The processor 1028 may process the data 1030 and the instructions 1032 received from the memory 1034, and information through the transceiver 1020, the base band communications module, and/or the network communications module. The processor 1028 may also process information to be sent to the transceiver 1020 for transmission through the antenna 1036, to the network communications module for transmission to a core network.

One or more presentation components 1038 presents data indications to a person or other device. Examples of presentation components 1038 may include a display device, speaker, printing component, vibrating component, etc.

From the above description, it is manifested that various techniques may be used for implementing the concepts described in the present application without departing from the scope of those concepts. Moreover, while the concepts have been described with specific reference to certain implementations, a person of ordinary skill in the art may recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A user equipment (UE) comprising:
    one or more non-transitory computer-readable media having computer-executable instructions embodied thereon; and
    at least one processor coupled to the one or more non-transitory computer-readable media, the at least one processor configured to execute the computer-executable instructions to:
    receive a plurality of configured grant configurations that allocate a group of Physical Uplink Shared Channel (PUSCH) durations in a bandwidth part (BWP), wherein all the PUSCH durations in the group overlap in a time domain;
    identify a set of one or more PUSCH durations from the group of PUSCH durations, each PUSCH duration in the identified set of one or more PUCSH durations usable for transmitting a medium access control (MAC) protocol data unit (PDU) generated from available data;
    select a specific PUSCH duration from the identified set of one or more PUSCH durations as a prioritized PUSCH duration; and
    perform uplink transmission on the prioritized PUSCH duration.

2. The UE of claim 1, wherein identifying the set of one or more PUSCH durations comprises determining that a configured grant timer associated with a Hybrid Automatic Repeat reQuest (HARD) process of each PUSCH duration from the identified set of one or more PUSCH durations is not running.

3. The UE of claim 1, wherein:
    a number of PUSCH durations in the identified set of one or more PUSCH durations is greater than 1; and
    the prioritized PUSCH duration corresponds to a configured grant configuration having a highest priority among configured grant configurations corresponding to the identified set of one or more PUSCH durations.

4. The UE of claim 1, wherein a number of PUSCH durations in the identified set of one or more PUSCH durations is 1.

5. The UE of claim 1, wherein the at least one processor is further configured to execute the computer-executable instructions to:
    stop a configured grant timer associated with a Hybrid Automatic Repeat reQuest (HARD) process for a deprioritized PUSCH duration,
    wherein the deprioritized PUSCH duration is different from the prioritized PUSCH duration and is in the group of PUSCH durations.

6. The UE of claim 5, wherein the configured grant timer is stopped after transmission on the deprioritized PUSCH duration has started.

7. A method for uplink transmission performed by a user equipment (UE), the method comprising:
   receiving a plurality of configured grant configurations that allocate a group of Physical Uplink Shared Channel (PUSCH) durations in a bandwidth part (BWP), wherein all the PUSCH durations in the group overlap in a time domain;
   identifying a set of one or more PUSCH durations from the group of PUSCH durations, each PUSCH duration in the identified set of one or more PUCSH durations usable for transmitting a medium access control (MAC) protocol data unit (PDU) generated from available data;
   selecting a specific PUSCH duration from the identified set of one or more PUSCH durations as a prioritized PUSCH duration; and
   performing uplink transmission on the prioritized PUSCH duration.

8. The method of claim 7, wherein identifying the set of one or more PUSCH durations comprises determining that a configured grant timer associated with a Hybrid Automatic Repeat reQuest (HARQ) process of each PUSCH duration from the identified set of one or more PUSCH durations is not running.

9. The method of claim 7, wherein:
   a number of PUSCH durations in the identified set of one or more PUSCH durations is greater than 1; and
   the prioritized PUSCH duration corresponds to a configured grant configuration having a highest priority among configured grant configurations corresponding to the identified set of one or more PUSCH durations.

10. The method of claim 7, wherein a number of PUSCH durations in the identified set of one or more PUSCH durations is 1.

11. The method of claim 7, further comprising:
    stopping a configured grant timer associated with a Hybrid Automatic Repeat reQuest (HARQ) process for a deprioritized PUSCH duration,
    wherein the deprioritized PUSCH duration is different from the prioritized PUSCH duration and is in the group of PUSCH durations.

12. The method of claim 11, wherein the configured grant timer is stopped after transmission on the deprioritized PUSCH duration has started.

* * * * *

UNITED STATES PATENT AND TRADEMARK OFFICE
CERTIFICATE OF CORRECTION

PATENT NO. : 11,297,642 B2
APPLICATION NO. : 16/678766
DATED : April 5, 2022
INVENTOR(S) : Heng-Li Chin et al.

It is certified that error appears in the above-identified patent and that said Letters Patent is hereby corrected as shown below:

In the Specification

In Column 16, Line 53, delete "1028" and insert -- 1026 --
In Column 16, Line 54, delete "1034" and insert -- 1028 --
In Column 16, Line 54, delete "1038" and insert -- 1034 --
In Column 17, Line 40, delete "1034" and insert -- 1028 --
In Column 17, Line 42, delete "1034" and insert -- 1028 --
In Column 17, Line 45, delete "1034" and insert -- 1028 --
In Column 17, Line 48, delete "1028" and insert -- 1026 --
In Column 17, Line 51, delete "1028" and insert -- 1026 --
In Column 17, Line 54, delete "1028" and insert -- 1026 --
In Column 17, Line 57, delete "1028" and insert -- 1026 --
In Column 17, Line 58, delete "1028" and insert -- 1026 --
In Column 17, Line 59, delete "1034" and insert -- 1028 --
In Column 17, Line 62, delete "1028" and insert -- 1026 --
In Column 17, Line 66, delete "1038" and insert -- 1034 --
In Column 18, Line 1, delete "1038" and insert -- 1034 --

Signed and Sealed this
First Day of November, 2022

Katherine Kelly Vidal
*Director of the United States Patent and Trademark Office*